(12) United States Patent
Adams et al.

(10) Patent No.: US 9,292,348 B2
(45) Date of Patent: Mar. 22, 2016

(54) SYSTEM OVERHEAD-BASED AUTOMATIC ADJUSTING OF NUMBER OF RUNNING PROCESSORS WITHIN A SYSTEM

(71) Applicant: INTERNATIONAL BUSINESS MACHINES CORPORATION, Armonk, NY (US)

(72) Inventors: Kevin S. Adams, Endicott, NY (US);
Mary Ellen Carollo, Ithaca, NY (US);
Brian K. Wade, Apalachin, NY (US);
Donald P. Wilton, Vestal, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

(21) Appl. No.: 13/942,901

(22) Filed: Jul. 16, 2013

(65) Prior Publication Data

US 2015/0026697 A1    Jan. 22, 2015

(51) Int. Cl.
*G06F 9/50* (2006.01)

(52) U.S. Cl.
CPC .............. *G06F 9/5027* (2013.01); *G06F 9/505* (2013.01); *G06F 9/5077* (2013.01); *G06F 9/5083* (2013.01); *G06F 2209/5022* (2013.01)

(58) Field of Classification Search
None
See application file for complete search history.

(56) References Cited

U.S. PATENT DOCUMENTS

| | | | |
|---|---|---|---|
| 6,339,840 B1 | 1/2002 | Kothari et al. | |
| 8,327,187 B1 * | 12/2012 | Metcalf | G06F 12/10 714/10 |
| 8,631,253 B2 * | 1/2014 | Laor | G06F 1/3287 710/29 |
| 2003/0115495 A1 * | 6/2003 | Rawson, III | G06F 1/3228 713/324 |
| 2006/0123422 A1 * | 6/2006 | Felter | G06F 9/5083 718/105 |
| 2013/0232504 A1 * | 9/2013 | Yan | G06F 1/3206 718/105 |
| 2014/0325524 A1 * | 10/2014 | Zangaro | G06F 9/5083 718/105 |

OTHER PUBLICATIONS

Vengerov, D.; "A reinforcement learning framework for utility-based scheduling in resource-constrained systems"; Future Generation Computer Systems, vol. 25, No. 7, pp. 728-736, Jul. 2009.
Shalev, L. et al.; "IsoStack—Highly Efficient Network Processing on Dedicated Cores"; USENIX ATC 2010; www.usenix.org/event/ATC10/tech/fullpaper/shalev.pdf . . . ; 2010.
"z/Architecture—Principles of Operation", IBM Publication No. SA22-7832-09, Tenth Edition, Sep. 2012, pp. 1-1568.

* cited by examiner

*Primary Examiner* — Qing Wu
(74) *Attorney, Agent, or Firm* — Damion Josephs, Esq.; Kevin P. Radigan, Esq.; Heslin Rothenberg Farley & Mesiti P.C.

(57) ABSTRACT

Data processing system efficiency is improved by automatically determining whether to adjust for a next time interval a number N of processors running within the system for processing a workload. The automatically determining includes obtaining a measure of operating system overhead by evaluating one or more characteristics of processor time of the N processors consumed within the system for a time interval, and obtaining a measure of system utilization of the N processors running within the system for processing the workload for the time interval. The automatically determining further includes automatically ascertaining whether to adjust the number N of processors running within the system for the next time interval to improve system efficiency using the obtained measure of operating system overhead and the obtained measure of system utilization of the N processors.

20 Claims, 8 Drawing Sheets

SYSTEM OVERHEAD-BASED AUTOMATIC ADJUSTING OF NUMBER OF RUNNING PROCESSORS WITHIN A SYSTEM

BACKGROUND

Multiprocessing computing systems are often built as a set of N similar processors all using the same physical memory. This arrangement is referred to in the art as symmetric multiprocessing (SMP). An operating system running on such hardware system uses the N processors in tandem to run the aggregate work of the system. For example, when the operating system is a Linux system, the Linux kernel dispatches user execution contexts, called processes, on the N real processors of the system. Similarly, when the operating system is a z/VM® system, the z/VM® kernel dispatches its execution contexts, called virtual processors, on the N real processors of the system. Windows®, another multiprocessor-capable processor operating system, operates similarly with its processes and processors. (z/VM® is a registered trademark of International Business Machines Corporation, of Armonk, N.Y., USA, and Windows® is a registered trademark of Microsoft Corporation, of Redmond, Wash., USA.)

In operating systems such as Linux, z/VM®, or Windows®, processor time is consumed either by user application execution contexts, or by the operating system kernel. Such consumption is interleaved. The typical behavior is that a user process will first run for a period of time, accruing processor time. Then, the user process will perform an operation or invoke an application programming interface (API) that will require the operating system kernel to intervene. The kernel intervenes to handle the condition, and it runs for a period of time, accruing processor time. When the kernel finishes handling the condition, the kernel returns control to the user application process.

Generally, the operating system kernel having to intervene requires the kernel to obtain serialization or mutual exclusion before handling the request. Such protection is required to assure that only one thread or processor at a time reads or updates the accessed kernel data structure(s). While lightweight serialization techniques are available in the literature, ultimately, all such techniques accomplish the same thing, namely, one-at-a-time access to these key data structure(s). The serial access is required to assure system integrity.

SUMMARY OF THE INVENTION

In accordance with one or more aspects of the present invention, a computer program product is provided which includes a computer-readable storage medium readable by a processor and storing executable instructions for execution by the processor for performing a method. The method includes: automatically determining whether to adjust a number N of processors running within a system for processing a workload. The system includes an operating system and the automatically determining includes: obtaining a measure of operating system overhead by evaluating one or more characteristics of processor time of the N processors consumed within the system for a time interval; obtaining a measure of system utilization of the N processors running within the system for processing the workload for the time interval; and automatically ascertaining whether to adjust the number N of processors running within the system for a next time interval to improve system efficiency using, at least in part, the obtained measure of operating system overhead and the obtained measure of system utilization of the N processors.

In another aspect, a computer system is provided which includes a memory, and a processor in communications with the memory, wherein the computer system is configured to perform a method. The method includes: automatically determining whether to adjust a number N of processors running within the computer system for processing a workload. The computer system includes an operating system and the automatically determining includes: obtaining a measure of operating system overhead by evaluating one or more characteristics of processor time of the N processors consumed within the system for a time interval; obtaining a measure of system utilization of the N processors running within the system for processing the workload for the time interval; and automatically ascertaining whether to adjust the number N of processors running within a system for a next time interval to improve system efficiency using, at least in part, the obtained measure of operating system overhead and the obtained measure of system utilization of the N processors.

In a further aspect, a method is provided which includes automatically determining whether to adjust a number N of processors running within a system for processing a workload, the system including an operating system and the automatically determining including: obtaining a measure of operating system overhead by evaluating one or more characteristics of processor time of the N processors consumed within the system for a time interval; and obtaining a measure of system utilization of the N processors running within the system for processing the workload for the time interval; and automatically ascertaining whether to adjust the number N of processors running within the system for a next time interval to improve system efficiency using, at least in part, the obtained measure of operating system overhead and the obtained measure of system utilization of the N processors.

Further, additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

As noted, an operating system kernel intervening typically requires the kernel to obtain serialization or mutual exclusion before handling an application process request. Such protection is required to ensure that only one thread or processor at a time reads or updates an accessed kernel data structure(s). Ultimately, such techniques accomplish the same thing, that is, one-at-a-time access to key kernel data structures to ensure system integrity.

One factor in determining the amount of serialization or mutual exclusion a system experiences is the number of processors competing for serialization. For example, a given workload running on ten processors at a given transaction rate can tend to experience more serialization per transaction than the same workload achieving the same transaction rate, but running on only five processors. Because the latter case exhibits less parallelism, it has the potential to reduce competition for serialization. Reduced competition for serialization tends to improve efficiency in use of processor time, since less processor time is spent trying to acquire serialization. Thus, the processor time spent per transaction performed can often be decreased if excess processors are removed from running.

Another factor in the amount of serialization or mutual exclusion the system experiences is the tendency of user application processes to require service from the operating system kernel. If the application work is largely computational and requires operating system assistance only seldom, the work can run effectively in a large N-way configuration without being exposed to using processor time excessively solely to acquire serialization for kernel functions. In fact, large N-way configurations are often desirable for such workloads, because the large N-way configuration reduces user processor dispatch latency.

When serialization overhead is high, however, the fraction of processor time spent in the kernel processing tends to increase. It has been discovered that high fractions of processor time being spent in the operating system kernel are generally indicative of excessive serialization. Thus, measurements of processor time consumed can be used to detect situations where excess serialization is causing inefficiency in the use of processor resources.

Therefore, it is deemed desirable to provide a facility to sense and react to those situations where it appears that excess serialization is causing inefficiency in the use of processor time. In other words, if the operating system kernel can sense that there is opportunity to avoid serialization overhead by pruning itself of excess running processors, it would be advantageous to do so. Further, the system should prune, or place to sleep, running processors if, and only if, the system detects that excess serialization overhead is present. For instance, it would be undesirable to stop using apparently excess processors on only a measure of total system processor utilization compared to system capacity. Such a practice could put to sleep processors which, although they are only slightly utilized, are not causing system overhead issues.

Before describing various automated processes for facilitating such system efficiency (in accordance with one or more aspects of the present invention), examples of data processing systems which may utilize the facilities disclosed herein are discussed below with reference to FIGS. 1-2.

Figure 1:
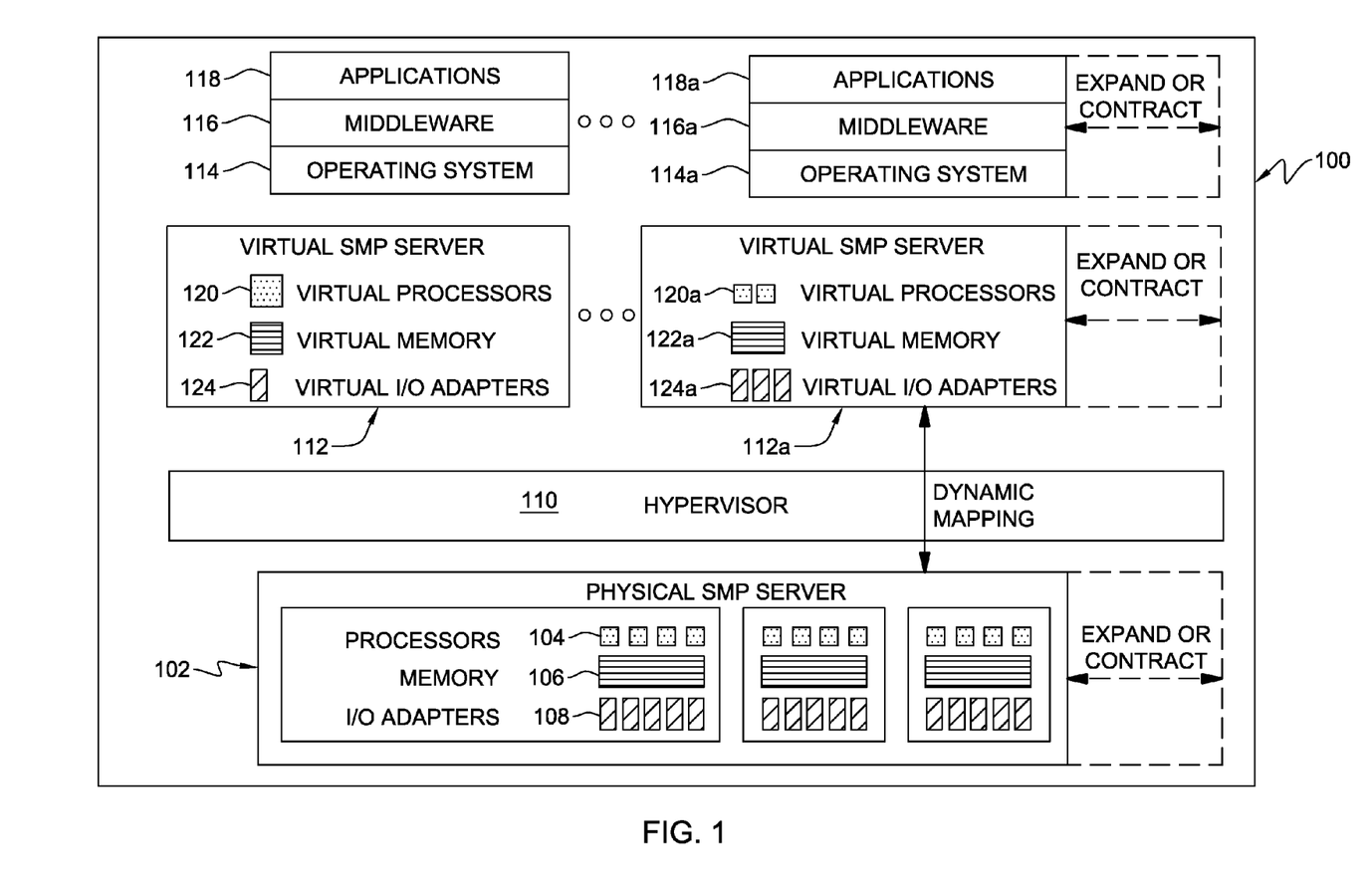
FIG. 1 is a block diagram of one embodiment of a data processing system to implement one or more aspects of the present invention.

FIG. 1 is a block diagram of a data processing or computer system 100, which in one example is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110. Processors 104 are shared processors and each may be a simultaneous multithreading (SMT)-capable processor that is capable of concurrently executing multiple different threads on the processor.

A virtual server is a proxy for a physical server that has the same capabilities, interfaces, and state. Virtual servers are created and managed by the hypervisor that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes a virtual processor 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level user applications.

Figure 2:
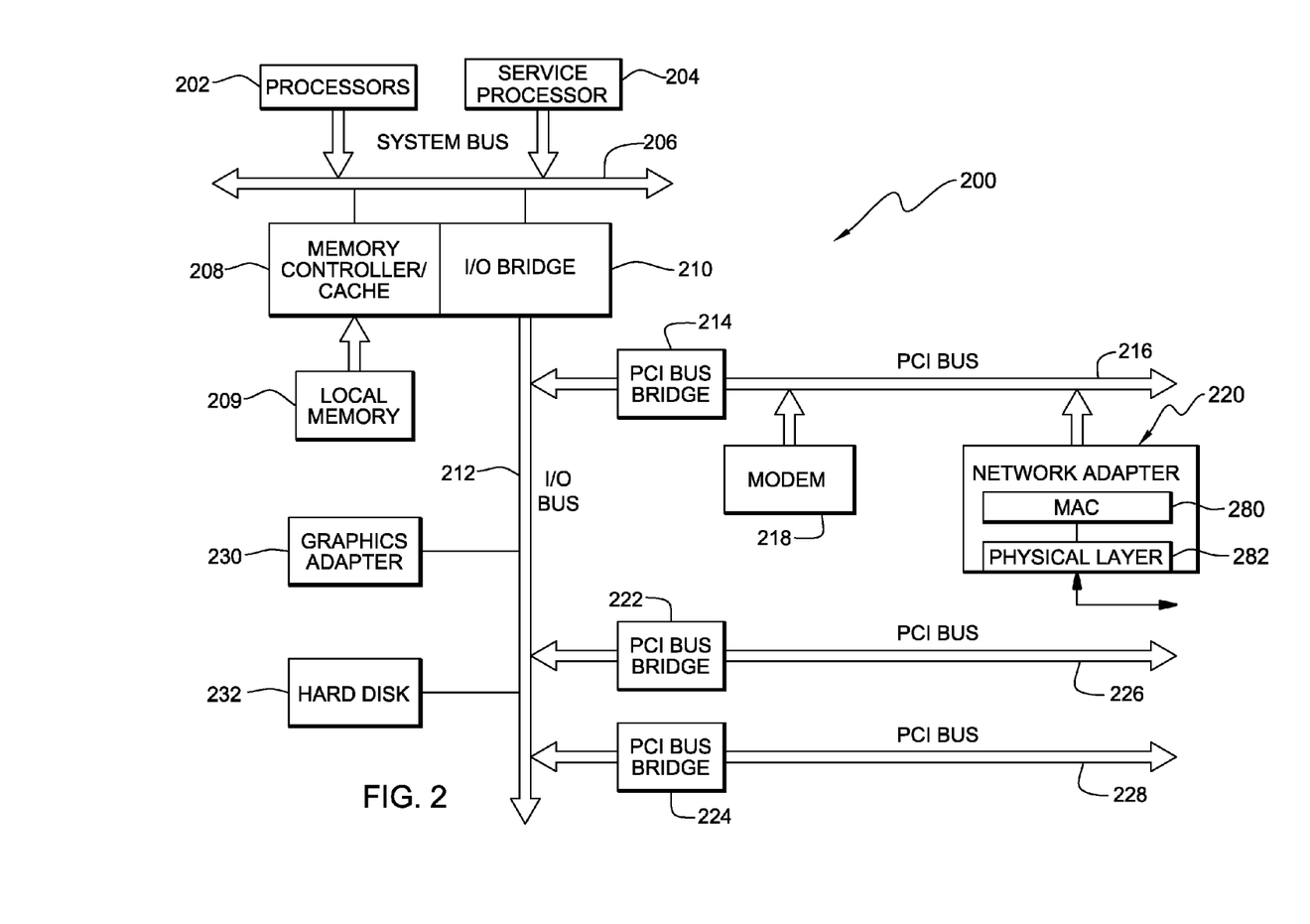
FIG. 2 is a more detailed illustration of one embodiment of a data processing system to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within various computers or data processing systems, such as those depicted in FIG. 1 or 2. As a specific, commercially available example, a data processing system implementing automated adjustment of the number N of processors running within the system, such as described herein below, can be built upon technologies found in IBM's z/Architecture® product line firmware and systemware, as described in the "z/Architecture® Principles of Operation", IBM Publication No. SA22-7832-09, $10^{th}$ Edition, September 2012 (pages 1-1568). (IBM® and z/Architecture® are registered trademarks of International Business Machines Corporation, Armonk, N.Y., U.S.A)

Generally stated, disclosed herein are computer program products, computer systems, and methods which automatically determine whether to adjust a number N of processors running within a system for processing a workload, and if so, for (for instance) selectively placing one or more undesired real processors of the N processors to sleep for a next time interval, or waking one or more desired processors of the N processors for the next time interval. The automatically determining includes, for instance, obtaining a measure of operating system overhead by evaluating one or more characteristics of processor time of the N processors consumed within the system for a time interval, and obtaining a measure of system utilization of the N processors running within the system for processing the workload for the time interval. Using, at least in part, the obtained measure of operating system overhead and the obtained measure of utilization of the N processors, the method includes automatically ascertaining whether to adjust the number N of processors running within the system for a next time interval to improve system efficiency.

Figure 3:
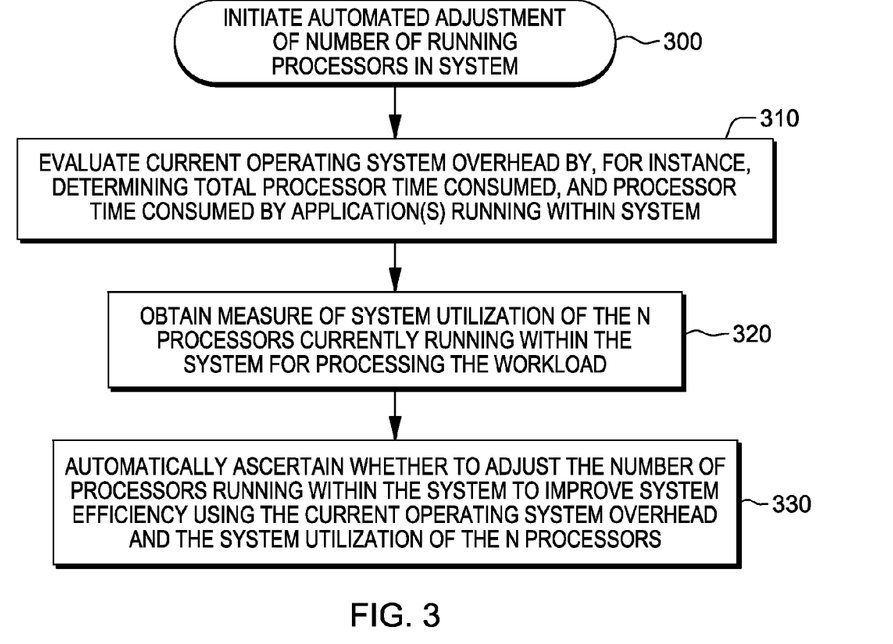
FIG. 3 illustrates one embodiment of a process for automated adjustment of the number N of processors running within a system for processing a workload, in accordance with one or more aspects of the present invention.

The process is depicted in the overview flow of FIG. 3, wherein upon initiating automated adjustment of the number N of running processors in a system 300, processing evaluates current operating system overhead 310. This may include, for instance, determining total processor time consumed, and processor time consumed by one or more applications running within the system on the N processors for a set sample interval or time interval. A representation (or measure) of system utilization of the N processors currently running within the system for processing the workload is obtained 320, and based on these values or measurements, processing automatically ascertains whether to adjust the number of processors currently running within the system to improve system efficiency in processing the workload for a next time interval 330.

In one embodiment, the measure of operating system overhead is determined as a ratio of total processor time consumed for a sample time interval (T) over the sum of processor time consumed for the sample time interval by any applications (V) running within the system. The automatically determining may be periodically repeated to, in part, obtain a sample history of the measure of operating system overhead and a sample history of the measure of system utilization (U) of the N processors for different time intervals, which (in one embodiment) may be successive sample time intervals. The automatically ascertaining may include utilizing the sample histories of the measure of operating system overhead and the sample history of the measure of system utilization (U) of the N processors to ascertain a projected operating system overhead ceiling (R') for the next time interval and a projected system utilization ceiling (U') for the next time interval, and the automatically ascertaining may include utilizing the projected operating system overhead ceiling (R') and projected system utilization ceiling (U') in determining whether to adjust the number N of processors currently running within the system for the next time interval to improve system efficiency. For instance, after repeating the automatically determining x+1 times, the method may include discarding an oldest measure of operating system overhead (R) from the sample history of the measures of operating system overhead, and discarding an oldest measure of system utilization (U) of the N processors from the sample history of the measure of system utilization of the N processors. In this manner, the sample histories represent moving sample histories of x sample time periods or repetitions of the automatically determining.

In one embodiment, the automatically ascertaining may include automatically determining a participating amount (A) of total processor capacity needed to participate in running the workload over the next time interval. The automatically ascertaining may further include comparing the projected operating system overhead ceiling (R') to at least one system overhead threshold and determining, based at least in part thereon, whether to adjust the number N processors running within a system to improve system efficiency in processing the workload for the next time interval.

For example, the automatically ascertaining may include determining whether the projected operating system overhead ceiling (R') is below a low system overhead threshold, and if so, may automatically set the participating amount (A) of the total processor's capacity to full processor capacity (C) for the next time interval. The automatically ascertaining may further include determining whether the projected operating system overhead ceiling (R') is above an upper system overhead threshold, and if so, may automatically set the participating amount (A) of total processor capacity to the projected system utilization ceiling (U') plus a set margin.

In another embodiment, the automatically determining may include determining whether the projected operating system overhead ceiling (R') is between a low system overhead threshold and a high system overhead threshold, and if so, may automatically set the participating amount (A) of total processor capacity for the next time interval to a value between full processor capacity (C) and the projected system utilization ceiling (U') plus a set margin.

In addition to automatically determining the desired number of processors running for the next time interval, processing may automatically place one or more processors of the N processors running within the system into, for instance, a sleep state, responsive to determining that the participating amount (A) of total processor capacity needed to participate in running the workload over the next time interval is less than the number of processors currently running within the system, which may be full processor capacity of the system, or less. Similarly, one or more sleeping processors may be awakened to facilitate processing the workload over the next time interval should the participating amount (A) of total processor capacity needed to participate in running the workload be above the current number of processors running within the system.

Advantageously, in one implementation, the processing disclosed herein takes advantage of processor time accounting, which may (in part) already be done by a data processing system, to sense situations where it appears that excessive real processors are causing excessive overhead, and there is no clear indication that the data processing system could function with fewer processors running To achieve the sensing, it is desirable to: develop a measure of system overhead that can be accomplished by looking at the characteristics of the processor time being consumed; develop a measure of system utilization that will identify those situations where it appears that the data processing system can function with fewer running processors; periodically repeat or determine the measurements; and at each sensing time interval, if it appears that the system is in a situation where processing efficiency may be improved by decreasing the processor count, to take action to do so.

As one example, systems such as IBM's z/VM® are capable of determining and displaying a quantity called the T/V ratio, which is the total processor time consumed within a time interval divided by the processor time consumed by user application processes running on the processors within the time interval. For example, in a given time interval, if the user application processes consumed 0.5 processor-seconds, and the operating system kernel consumed 0.3 processor-seconds, the T/V ratio would be (0.5+0.3)/0.5 or 1.6. It should be noted that when the workload is such that the operating system kernel is barely running, the T/V ratio approaches 1.0.

In addition, systems such as IBM's z/VM® already determine the total system processor utilization and display processor utilization, for instance, with system capacity. For example, a computing system embodying eight real processors might have a capacity of 800%, but owing to a workload's characteristics, might be running at only 600% at a current time.

When the T/V ratio is high and utilization is below capacity, it is feasible to reduce system overhead by putting to sleep unneeded processors. For example, in a system with capacity of 800%, if it is observed that the T/V ratio is currently at 3.0, and system utilization is at 425%, it has been discovered that the system may run with five processors instead of eight, and thereby reduce operating system overhead (or "overhead") incurred because of excessive serialization.

The processing disclosed herein is iterative. At, for instance, regular intervals, the system may sample the T/V ratio and total utilization, and add these two new samples to respective sample histories, discarding, for instance, the oldest samples from the respective histories. Using the new sample histories and a statistical approach, processing projects likely ceilings for the next T/V ratio (R') and the next system utilization (U') for a next time interval. If the projections fall within a defined range, for instance, where T/V will be high and utilization will be below capacity, then the system may automatically remove one or more processors from the configuration by, for instance, placing the one or more processors to sleep so as not to participate in processing the workload for the next time interval.

As one example of the process, the system may proceed as follows. Using processor time accrued by user application processes, and by the operating system since the last sample interval, that is, using the respective values for a current time interval, the system determines the current interval's T/V ratio, and adds the determined T/V ratio to a sample history of T/V ratios. In one embodiment, ten samples may be maintained within the sample history. The system then projects a ceiling (R') on the next sample interval's T/V ratio. This can be accomplished, for instance, by determining the mean(T/V)+k×stdev(T/V), where mean(T/V) is the mean function, "stdev" is the standard deviation function, and k is a coefficient chosen from the area under the normal distribution probability density function. For example, if it is desirable to project a ceiling with 80% confidence, k may be chosen to equal 0.842, since 80% of the area under the normal distribution probability density function lies to the left of m+0.842×sd.

Using the same statistical approach, the system may track the total processor utilization (U) and project a utilization ceiling (U') for a next time interval. If the projected utilization ceiling (U') is small enough, the system may remove one or more processors from the configuration, down to a desirable level necessary to contain the projected utilization ceiling (U'). In one embodiment, this may involve using two T/V threshold values, referred to herein as a low system overhead threshold ($Th_{low}$) and a high system overhead threshold ($Th_{high}$). For a projected overhead ceiling (R') less than the low system overhead threshold ($Th_{low}$), no processor pruning is performed, since there is a low enough overhead so as not to require putting any processors to sleep. For a projected overhead ceiling (R') greater than the high system overhead threshold ($Th_{high}$), the system reduces the apparently excessive number of processors as much as possible, that is, the system pares the number of running processors down to a minimum number of processors apparently required to contain the projected utilization ceiling (U') plus a set margin. For projected overhead (R') values that are between the low system overhead threshold and the high system overhead threshold, the system may proportionally reduce the number of running processors, for instance, in a linear manner between the two thresholds. The system then runs with the determined number of processors processing the workload until that time interval expires, at which point, the above-summarized processing may be repeated.

By way of specific example, assume that the projected overhead ceiling (R') lies 60% of the way between the low system overhead threshold and the high system overhead threshold, and further that the capacity of the system is 2400%, and the projected utilization ceiling (U') is 1325%. The system would need 14 processors to contain the projected utilization (U'), which means that 10 processors may be unneeded. Because the projected utilization (U') is 60% of the way towards the high system overhead threshold, the system could remove 60% of those 10 unneeded CPUs from the configuration. Thus, for the next time interval, the system would operate with 14+4=18 processors running the workload. When the interval expires, the process may be repeated.

Figure 4A:
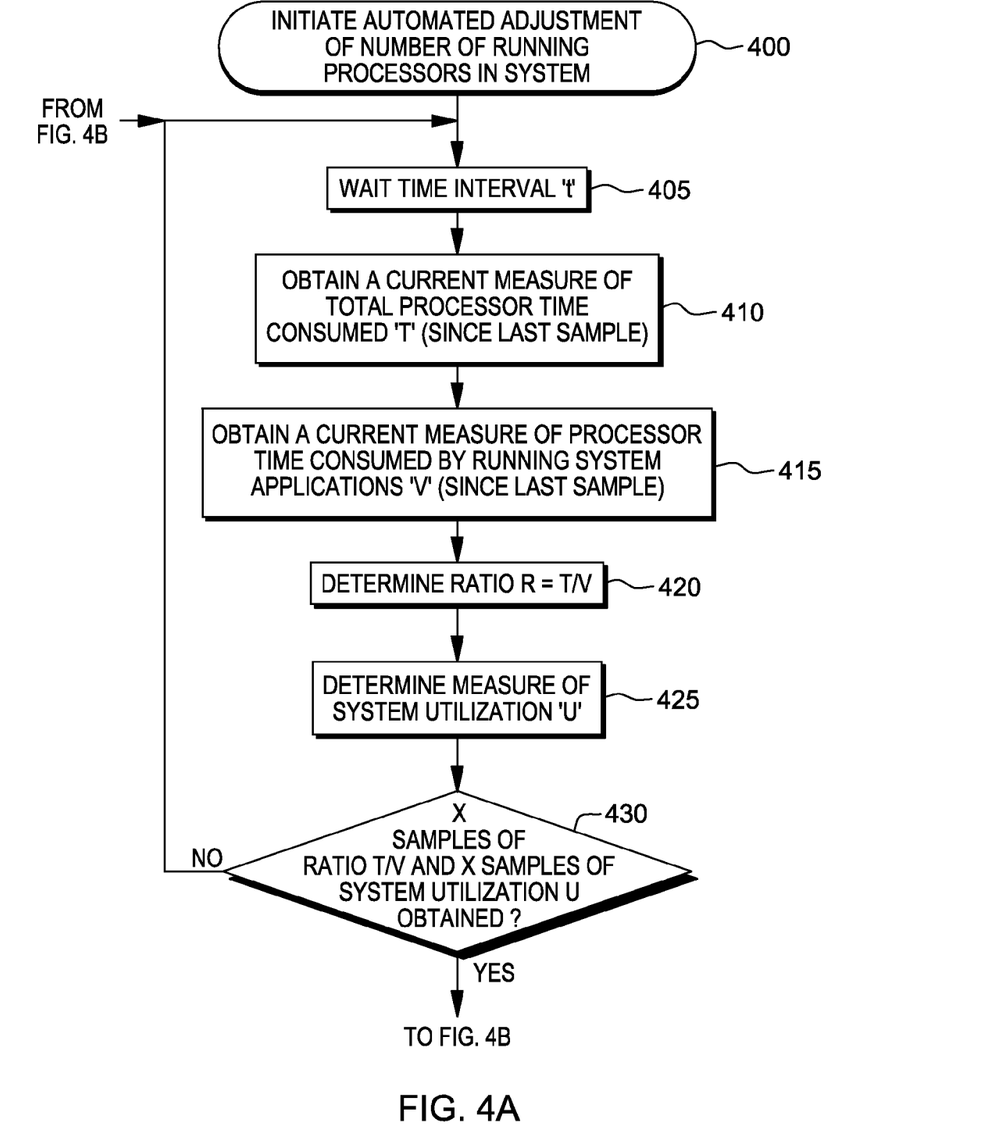
FIGS. 4A & 4B depict a more detailed embodiment of a process for automated adjustment of the number N of processors running within a system for processing a workload, in accordance with one or more aspects of the present invention.
Figure 4B:
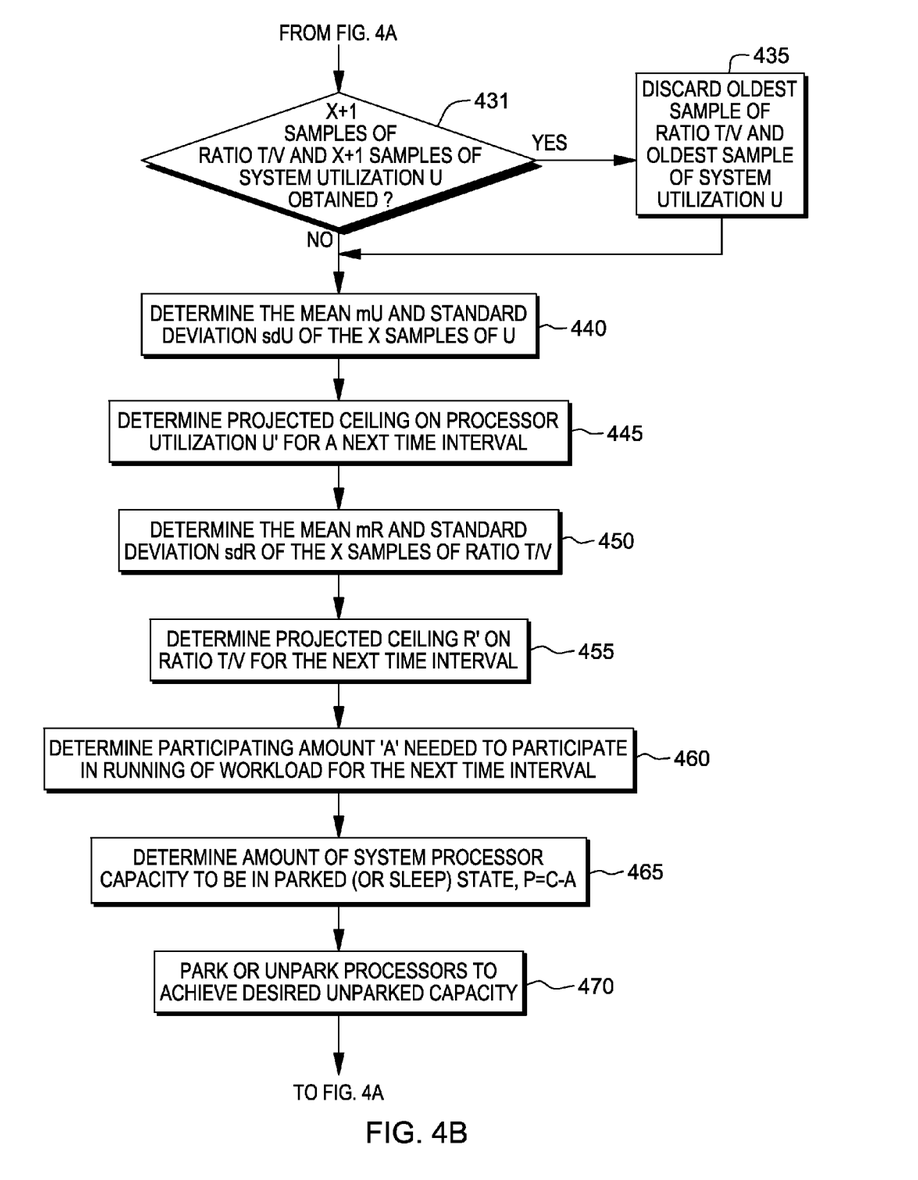

FIGS. 4A & 4B depict one embodiment of the above-noted processing. Referring to these figures collectively, automated adjustment of the number of running processors in the system is initiated 400, and processing waits a time interval t 405 before obtaining a current representation or measure of total processor time (T) consumed for the sample interval 410, and a current representation or measure of processor time consumed by user applications (U) for the sample interval 415. From this information, the ratio R=T/V 420 is determined, as is a measure of system utilization (U) 425. The system's processor utilization percentage may be determined according to the formula U=100×(T/S). For example, if the system consumed 4.5 seconds of CPU time in the last 2 second time interval, then U=100×(4.5/2)=225%.

Processing determines whether x samples of the ratio T/V and x samples of the system utilization (U) have been obtained 430, and if "no", branches back to await a next time interval 't' 405, before repeating the collection of measurements. If "yes", then processing determines whether x+1 samples of the T/V and ratio x+1 samples of the system utilization (U) have been obtained 431. If "yes", processing discards the oldest sample from the sample history of the ratio T/V and the oldest sample from the sample history of the system utilization (U) 435, after which processing determines the mean (mU) and the standard deviation (sdU) of the x samples of system utilization U 440. As noted, the mean m is the average of the samples in the history. For x samples, the samples are added, and divided by x to achieve the mean. To compute the standard deviation, first the mean of the squares ($s^2$) of the samples is computed, as well as the square of the mean ($m^2$) of the samples, and the variance (v) of the samples, according to the formula $(v)=s^2-m^2$. The standard deviation (sd) of the samples may be determined according to the formula sd=sqrt(v), where sqrt is a square root function.

Processing next determines the projected ceiling on processor utilization (U') for the next time interval 445. This can be accomplished, for instance, using the formula U'=mU+(k×sdU), where kU is a normal distribution area coefficient chosen according to the confidence percentage desired for the projected ceiling (U'). In one embodiment, a 95% confidence ceiling may be desired for projected ceiling (U'), and therefore, kU=1.645. Stated otherwise, this step may involve computing U'=mU+(1.645×sdU).

Next, processing determines the mean (mR) and the standard deviation (sdR) of the x samples for the ratio T/V 450. Using these determinations, the projected ceiling (R') may be determined on the ratio T/V for the next time interval 455.

Note that in the discussion provided herein, the processor times used in the T/V ratio experienced are considered to be normally distributed random variables. In other words, the samples collected of these values are considered to have normal distributions. Because of this consideration, it is possible to use the area under the normal distribution probability density function to predict how likely it is that the random variable will exhibit a value, that is, provide a sample, that is greater than or equal to a proposed ceiling value. In particular, it is possible to use the samples' mean and standard deviation to do this prediction.

Figure 4C:
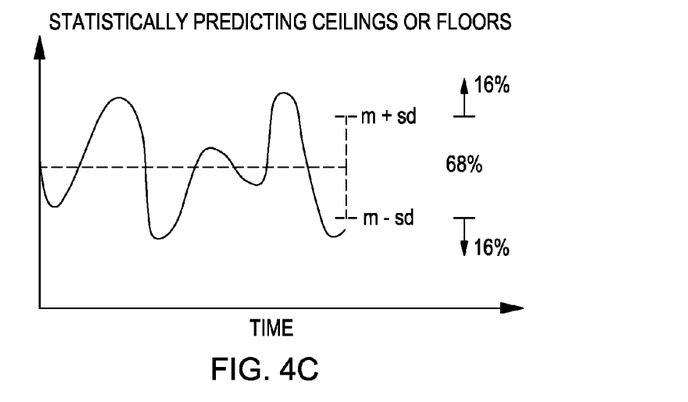
FIG. 4C is a graph illustrating statistical prediction of a ceiling or floor which may be used in automated adjustment of the number of processors running within a system, in accordance with one or more aspects of the present invention.

For example, if the proposed ceiling value is exactly 1.0 multiple of the standard deviation above the samples' mean, it is known that it is only 16% likely that the next sample to be collected will be greater than the proposed ceiling value. This is because only 16% of the area under the normal distribution probability density function lies to the right of the proposed ceiling value. FIG. 4C illustrates this. Equivalently, it is possible to determine a proposed ceiling value for which it is some given x % likely that the next collected sample will be less than or equal to the determined proposed ceiling. This can also be accomplished using the samples' mean and standard deviation. For instance, if it is desired to calculate the proposed ceiling that will show a 90% confidence, then the standard deviation multiplier 1.281 may be used because 90% of the area under the normal distribution probability density function lies to the left of mean m+1.281 multiples of the standard deviation (sd). The area under the normal distribution probability density function can be found tabulated throughout the literature of mathematics and applied sciences.

Figure 5A:
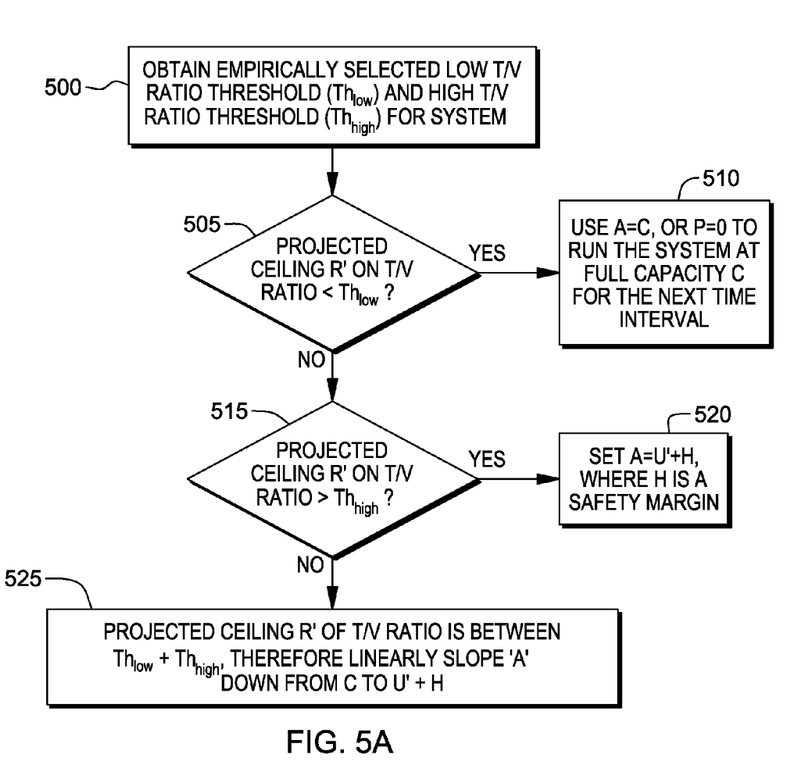
FIG. 5A depicts one embodiment of a process for determining a participating number of processors of the system desired to participate in running the workload for a next time interval, in accordance with one or more aspects of the present invention.
Figure 5B:
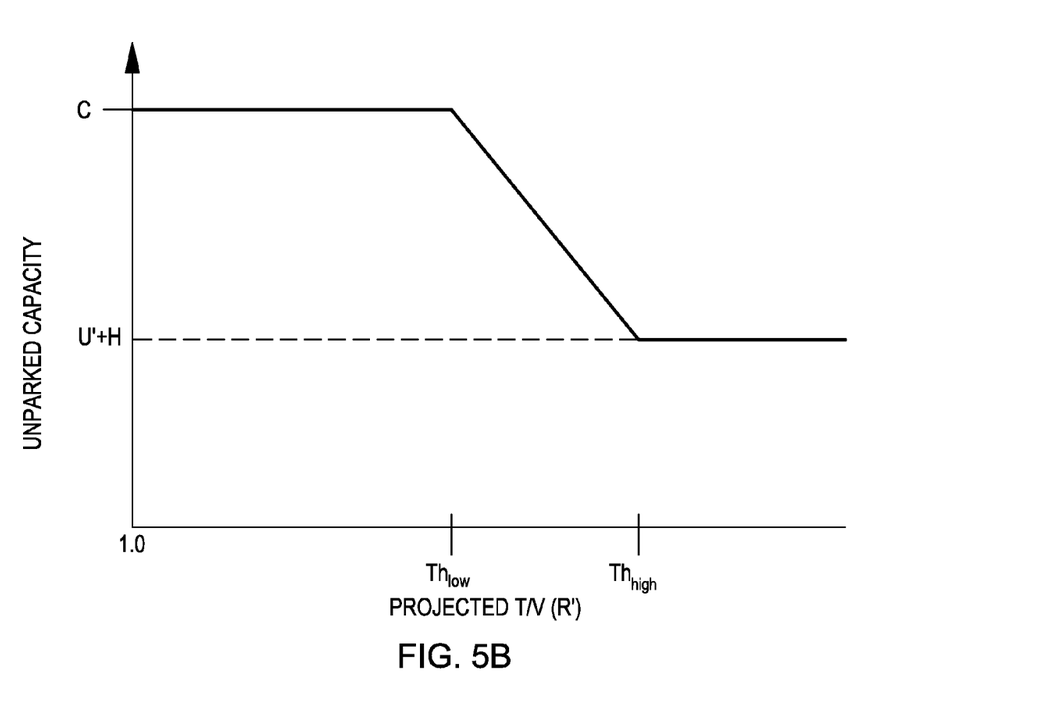
FIG. 5B graphically represents determining a participating amount of processors to run the workload for the next time interval, in accordance with one or more aspects of the present invention.

Processing next determines a participating amount (A) of processors needed to participate in running the workload for the next time interval 460. This may be determined as illustrated in the process of FIG. 5A by predefining or obtaining an empirically selected low T/V ratio threshold ($Th_{low}$) and a high T/V ratio threshold (Th$_{high}$) for the system 500. In one embodiment, the low T/V ratio threshold and high T/V ratio threshold are referred to as the low system overhead threshold and high system overhead threshold. The projected ceiling (R') on the T/V ratio is evaluated relative to the low threshold 505, and if below, the participating amount (A) is set to full capacity (C) of the system, or the amount of parked or processors placed into sleep state (P) is set to zero, allowing the system to run at full capacity 510. If the projected ceiling (R') is greater than or equal to the low system overhead threshold (Th$_{low}$), then processing determines whether the projected ceiling (R') of the T/V ratio is greater than the high system overhead threshold (Th$_{high}$), and if so, sets the participating amount (A) of processors equal to a number of processors needed to meet the projected ceiling on processor utilization (U') for the next time interval plus a set safety margin (H) 520. If the projected ceiling (R') on the T/V ratio is between the low and high system overhead thresholds, then the participating amount (A) of processors may be selected by linearly adjusting the number of processors down from full processor capacity (C) to the projected ceiling on processor utilization (U') plus the set margin (H), that is, the number of processors required to meet the projected ceiling (U') plus the set amount (H) 525. This is graphically illustrated in FIG. 5B.

Continuing with the process of FIGS. 4A & 4B, using the participating amount (A) of processors needed to run the workload for the next time interval, processing determines the amount of system processor capacity to be parked (or placed into sleep state) or unparked, that is, removed from or added for participation in running of the workload 465, and processing either parks or unparks real processors to achieve the desired unparked processor capacity, that is, the desired number of processors running to perform the workload 470, before returning to wait the next time interval 405 and repeat the process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 6:
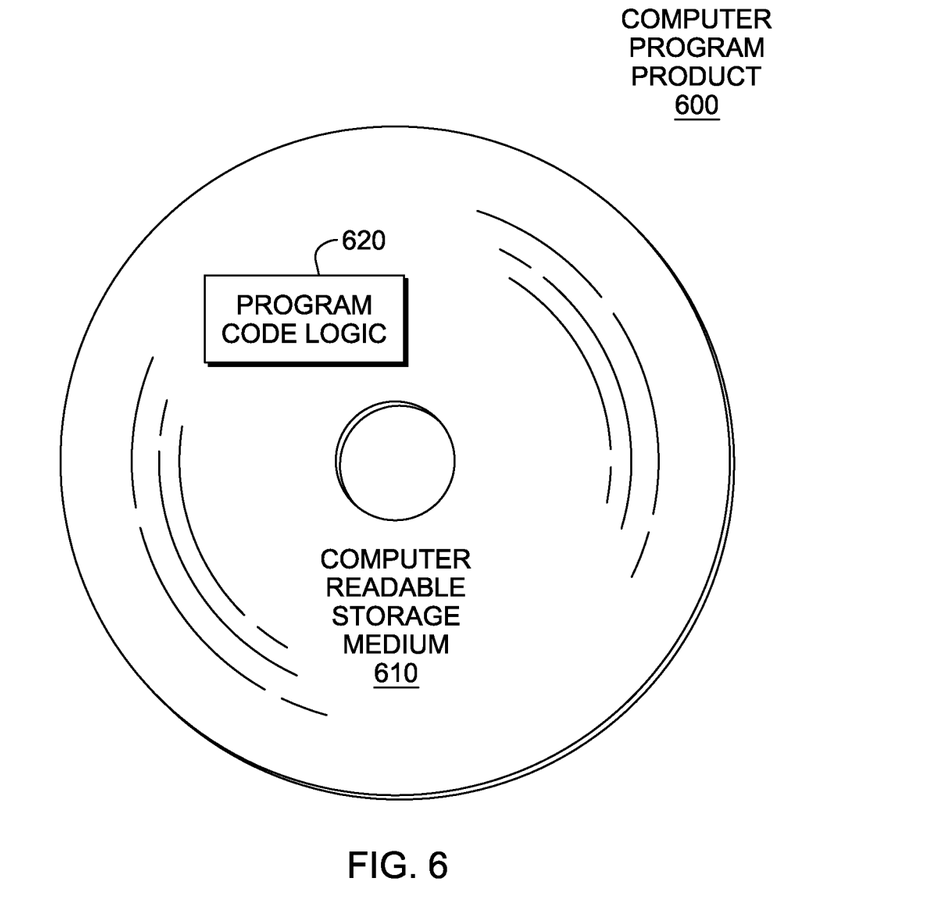
FIG. 6 depicts one embodiment of a computer program product incorporating one or more aspects of the present invention.

Referring now to FIG. 6, in one example, a computer program product 600 includes, for instance, one or more non-transitory computer readable storage media 602 to store computer readable program code means or logic 604 thereon to provide and facilitate one or more aspects of the present invention.

Program code embodied on a computer readable medium may be transmitted using an appropriate medium, including but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as JAVA, Smalltalk, C++ or the like, and conventional procedural programming languages, such as the "C" programming language, assembler or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to one or more embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more aspects. As one example, the deploying of an application comprises providing computer infrastructure operable to perform one or more aspects of the present invention.

As a further aspect, a computing infrastructure may be deployed comprising integrating computer readable code into a computing system, in which the code in combination with the computing system is capable of performing one or more aspects.

As yet a further aspect, a process for integrating computing infrastructure comprising integrating computer readable code into a computer system may be provided. The computer system comprises a computer readable medium, in which the computer medium comprises one or more aspects. The code in combination with the computer system is capable of performing one or more aspects.

Although various embodiments are described above, these are only examples. For example, computing environments of other architectures can incorporate and use one or more aspects of the present invention.

Further, other types of computing environments can benefit from one or more aspects. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer program product comprising:
a non-transitory computer-readable storage medium readable by a processor and storing executable instructions for execution by the processor for performing a method comprising:
automatically determining whether to adjust a number N of processors running within a system for processing a workload, the system comprising an operating system, and the automatically determining comprising:
obtaining a measure of operating system overhead by evaluating one or more characteristics of processor time of the N processors consumed within the system for a time interval;
obtaining a measure of system utilization of the N processors running within the system for processing the workload for the time interval; and
automatically ascertaining whether to adjust the number N of processors running within the system for a next time interval to improve system efficiency using, at least in part, the obtained measure of operating system overhead and the obtained measure of system utilization of the N processors.

2. The computer program product of claim 1, wherein the measure of operating system overhead comprises a ratio of total processor time consumed for the time interval (T) over the sum of processor time consumed for the time interval by applications (V) running within the system.

3. The computer program product of claim 2, wherein the method further comprises periodically repeating the automatically determining to, in part, obtain a sample history of the measure of operating system overhead and a sample history of the measure of system utilization of the N processors for different time intervals, and wherein the automatically ascertaining comprises utilizing the sample histories of the measure of operating system overhead and the measure of system utilization of the N processors to project an operating system overhead ceiling (R') for the next time interval and a system utilization ceiling (U') for the next time interval, and the automatically ascertaining comprises utilizing the projected operating system overhead ceiling (R') and projected system utilization ceiling (U') in determining whether to adjust the number N of processors running within the system for the next time interval to improve system efficiency.

4. The computer program product of claim 3, further comprising, after repeating the automatically determining x+1 times, discarding an oldest measure of operating system overhead from the sample history of the measure of operating system overhead and discarding an oldest measure of system utilization of the N processors from the sample history of the measure of system utilization of the N processors.

5. The computer program product of claim 4, wherein the automatically ascertaining comprises automatically determining a participating amount (A) of total processor capacity needed to participate in running the workload over the next time interval.

6. The computer program product of claim 5, wherein the automatically ascertaining further comprises comparing the projected operating system overhead ceiling (R') to at least one system overhead threshold and determining, based at least in part thereon, whether to adjust the number N of processors miming within the system for the next time interval to improve system efficiency.

7. The computer program product of claim 5, wherein the automatically ascertaining further comprises determining whether the projected operating system overhead ceiling (R') is below a low system overhead threshold, and if so, setting the participating amount (A) of total processor capacity to full processor capacity for the next time interval.

8. The computer program product of claim 5, wherein the automatically determining further comprises determining whether the projected operating system overhead ceiling (R') is above an upper system overhead threshold, and if so, setting the participating amount (A) of total processor capacity to the projected operating system utilization ceiling (U') plus a set margin.

9. The computer program product of claim 5, wherein the automatically determining further comprises determining whether the projected operating system overhead ceiling (R') is between a low system overhead threshold and a high system overhead threshold, and if so, setting the participating amount (A) of total processor capacity for the next time interval to a value between full processor capacity, and the projected system utilization ceiling (U') plus a set margin.

10. The computer program product of claim 5, further comprising automatically placing one or more processors of the N processors running within the system into a sleep state responsive to determining that the participating amount (A) of total processor capacity needed to participate in running the workload over the next time interval is less than the number N of processors currently running within the system.

11. A computer system comprising:
a memory; and
a processor in communications with the memory, wherein the computer system configured to perform a method comprising:
automatically determining whether to adjust a number N of processors running within the computer system for processing a workload, the computer system comprising an operating system and the automatically determining comprising:
obtaining a measure of operating system overhead by evaluating one or more characteristics of processor time of the N processors consumed within the system for a time interval;
obtaining a measure of system utilization of the N processors running within the system for processing the workload for the time interval; and
automatically ascertaining whether to adjust the number N of processors running within the system for a next time interval to improve system efficiency using, at least in part, the obtained measure of operating system overhead and the obtained measure of system utilization of the N processors.

12. The computer system of claim 11, wherein the measure of operating system overhead comprises a ratio of total processor time consumed for the time interval (T) over the sum of processor time consumed for the time interval by applications (V) running within the system.

13. The computer system of claim 12, wherein the method further comprises periodically repeating the automatically determining to, in part, obtain a sample history of the measure of operating system overhead and a sample history of the measure of system utilization of the N processors for different time intervals, and wherein the automatically ascertaining comprises utilizing the sample histories of the measure of operating system overhead and the measure of system utilization of the N processors to project an operating system overhead ceiling (R') for the next time interval and a system utilization ceiling (U') for the next time interval, and the automatically ascertaining comprises utilizing the projected operating system overhead ceiling (R') and projected system utilization ceiling (U') in determining whether to adjust the number N of processors running within the system for the next time interval to improve system efficiency.

14. The computer system of claim 13, further comprising, after repeating the automatically determining x+1 times, discarding an oldest measure of operating system overhead from the sample history of the measure of operating system overhead and discarding an oldest measure of system utilization of the N processors from the sample history of the measure of system utilization of the N processors.

15. The computer system of claim 14, wherein the automatically ascertaining further comprises comparing the projected operating system overhead ceiling (R') to at least one system overhead threshold and determining, based at least in part thereon, whether to adjust the number N of processors running within the system for the next time interval to improve system efficiency.

16. A method comprising:
automatically determining whether to adjust a number N of processors running within a system for processing a workload, the system comprising an operating system and the automatically determining comprising:
obtaining a measure of operating system overhead by evaluating one or more characteristics of processor time of the N processors consumed within the system for a time interval;
obtaining a measure of system utilization of the N processors running within the system for processing the workload for the time interval; and
automatically ascertaining whether to adjust the number N of processors running within the system for a next time interval to improve system efficiency using, at least in part, the obtained measure of operating system overhead and the obtained measure of system utilization of the N processors.

17. The method of claim 16, wherein the measure of operating system overhead comprises a ratio of total processor time consumed for the time interval (T) over the sum of processor time consumed for the time interval by applications (V) running within the system.

18. The method of claim 17, further comprising periodically repeating the automatically determining to, in part, obtain a sample history of the measure of operating system overhead and a sample history of the measure of system utilization of the N processors for different time intervals, and wherein the automatically ascertaining comprises utilizing the sample histories of the measure of operating system overhead and the measure of system utilization of the N processors to project an operating system overhead ceiling (R') for the next time interval and a system utilization ceiling (U') for the next time interval, and the automatically ascertaining comprises utilizing the projected operating system overhead ceiling (R') and projected system utilization ceiling (U') in determining whether to adjust the number N of processors running within the system for the next time interval to improve system efficiency.

19. The method of claim 18, further comprising, after repeating the automatically determining x+1 times, discarding an oldest measure of operating system overhead from the sample history of the measure of operating system overhead and discarding an oldest measure of system utilization of the N processors from the sample history of the measure of system utilization of the N processors.

20. The method of claim 19, wherein the automatically ascertaining further comprises comparing the projected operating system overhead ceiling (R') to at least one system overhead threshold and determining, based at least in part thereon, whether to adjust the number N of processors running within the system for the next time interval to improve system efficiency.

* * * * *